(12) United States Patent
Matsumoto et al.

(10) Patent No.: US 7,692,728 B2
(45) Date of Patent: Apr. 6, 2010

(54) TOUCH PANEL

(75) Inventors: Kenichi Matsumoto, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 11/969,593

(22) Filed: Jan. 4, 2008

(65) Prior Publication Data
US 2008/0204610 A1    Aug. 28, 2008

(30) Foreign Application Priority Data
Feb. 22, 2007   (JP) .............................. 2007-041893

(51) Int. Cl.
*G01F 1/1333*   (2006.01)
(52) U.S. Cl. ...................... 349/12; 349/96; 349/117
(58) Field of Classification Search .................. 349/12, 349/96, 117, 158; 257/797; 353/8
See application file for complete search history.

(56) References Cited

U.S. PATENT DOCUMENTS

| | | | | |
|---|---|---|---|---|
| 6,958,797 | B2* | 10/2005 | Kawahara et al. ........... 349/115 |
| 7,359,017 | B2* | 4/2008 | Umeda et al. ............... 349/117 |
| 7,541,411 | B2* | 6/2009 | Miyamoto et al. .......... 525/539 |
| 2007/0200259 | A1* | 8/2007 | Nakanishi et al. ........... 257/797 |

FOREIGN PATENT DOCUMENTS

JP    2006-79149    3/2006

* cited by examiner

*Primary Examiner*—Thoi V Duong
(74) *Attorney, Agent, or Firm*—Wenderoth, Lind & Ponack, L.L.P.

(57) ABSTRACT

Disclosed here is a touch panel with improved visibility. The polarizing plate of the touch panel has a laminated structure in which the polarizing layer is sandwiched between the upper protective layer and the lower protective layer. Of the three layers, the lower protective layer is formed as a phase-difference layer with ¼ wavelength made of a cycloolefin-based polymer. The structure protects the polarizing plate from distortion and deterioration, offering good visibility. At the same time, the structure above contributes to a reduced parts count and accordingly a cost-reduced touch panel.

18 Claims, 2 Drawing Sheets

TOUCH PANEL

TECHNICAL FIELD

The present invention relates a touch panel mainly used for the operation of electronic devices.

BACKGROUND ART

In recent years, there has been a growing trend to incorporate advanced various functions into electronic devices, such as mobile phones and car navigation systems. In such a trend, a touch panel has been widely employed for ease of operation. For example, a light-transmissive touch panel is attached on the front surface of a liquid crystal display (LCD) element. A user presses a touch panel with a finger or stylus, while viewing letters, symbols and graphics shown by the LCD element on the back surface of the touch panel and selects a desired function. As the demand for a touch panel increases, manufacturers have sought a user-friendly touch panel with good visibility.

A conventional touch panel will be described with reference to FIG. 4.

FIG. 4 is a sectional view of a conventional touch panel. For sake of clarity, the figure shows dimensions enlarged in the thickness direction.

The touch panel shown in FIG. 4 has upper substrate 1, lower substrate 2, upper conductive layer 3 and lower conductive layer 4. Substrates 1 and 2 are made of a light-transmissive film. Conductive layers 3 and 4 are also formed of light-transmissive material, such as indium-tin oxide. Upper conductive layer 3 is disposed on the bottom surface of upper substrate 1, and lower conductive layer 4 is disposed on the top surface of lower substrate 2; conductive layers 3 and 4 are sandwiched between upper substrate 1 and lower substrate 2.

A plurality of dot spacers (not shown) are formed with insulating resin at predetermined spaced intervals on the top surface of lower conductive layer 4. A pair of upper electrodes (not shown) is formed at both ends of upper conductive layer 3; similarly, at both ends of lower conductive layer 4, a pair of lower electrodes (not shown) is formed in an arrangement perpendicular to that of the upper electrodes.

Frame-shaped spacer 5 is disposed between upper conductive layer 3 and lower conductive layer 4 to separate them. Spacer 5 has an adhesive layer (not shown) coat-formed on the top and bottom surfaces or either one of the surfaces, by which the peripheries of upper substrate 1 and lower substrate 2 are bonded with each other. Upper conductive 3 faces lower conductive layer 4 at predetermined spaced intervals.

Upper phase-difference plate 6 with ¼ wavelength, which is an oriented film having birefringence made of polycarbonate, is disposed on the top surface of upper substrate 1, and similarly formed lower phase-difference plate 7 is disposed on the bottom surface of lower substrate 2. The phase-difference plates above are bonded to each substrate with adhesive (not shown).

Polarizing plate 8 has a laminated structure in which polarizing layer 8a is sandwiched between upper protective layer 8b and lower protective layer 8c. For example, polarizing layer 8a is made of polyvinyl alcohol with iodine and dye oriented, while protective layers 8b, 8c are made of triacetyl cellulose. Such structured polarizing plate 8 is attached on upper phase-difference plate 6.

On the other hand, polarizing plate 9 is attached on LCD element 10. The touch panel structured above is disposed on LCD element 10 through polarizing plate 9, and each pair of upper electrodes and lower electrodes is connected to the electronic circuit (not shown) of the electronic device.

Now will be described how such structured touch panel works. A user presses the touch panel with a finger or stylus, viewing the displays shown by LCD element 10 on the back surface of the touch panel. The application of depressing force depresses down a position of polarizing plate 8, upper phase-difference plate 6 and upper substrate 1, allowing a position of upper conductive layer 3 corresponding to the depressed position to make contact with lower conductive layer 4. Through the connection of the conductive layers, voltage is applied to the upper electrodes and the lower electrodes from the electric circuit. The electronic circuit detects the depressed position from voltage ratio between the electrodes. The electronic device thus recognizes the user's selection and switches to the desired function.

In the operation above, extraneous light 11 such as sunlight and lamplight comes from above and passes through polarizing plate 8. Here, suppose that polarizing plate 8 absorbs Y-directional light wave perpendicular to X-direction light wave. In this case, extraneous light 11 changes to X-directional linearly polarized light 11a and enters into upper phase-difference plate 6 from polarizing plate 8. This light, as a result of passing through upper phase-difference plate 6 with ¼ wavelength, changes from linearly polarized light to circularly polarized light and reflects upward (as reflected light 11b) at lower conductive layer 4.

When reentering upper phase-difference plate 6, reflected light 11b undergoes another ¼ polarization, so that reflected light 11b goes into polarizing plate 8 as a Y-directional linearly polarized light with a phase-shift of ½ wavelength. Polarizing plate 8 allows only X-directional light wave to pass through. Reflected light 11b, which is a Y-directional light wave, is blocked by polarizing plate 8. The extraneous light 11 entered the touch panel from above reflects upward at lower conductive layer 4, however, the reflected light 11b is blocked by polarizing plate 8 and does not exit from polarizing plate 8 that serves as an operation panel. The structure offers a reflection-free good visibility of LCD element 10 on the back surface of the touch panel.

For example, Japanese Patent Unexamined Publication No. 2006-79149 is known in a prior-art reference relating to the present invention.

According to the conventional touch panel, polarizing plate 8 is a laminated structure in which polyvinyl-alcohol-made polarizing layer 8a is sandwiched between upper and lower protective layers 8b, 8c made of triacetyl cellulose. Triacetyl cellulose is a relatively low heat-resistant material, up to approx. 90° C. When the structure is subjected to great heat, for example, in full sunlight, warpage or distortion can occur. Besides, humidity can be a factor of deteriorating polarizing characteristics. The aforementioned inconveniencies can cause mechanical distortion of the touch panel and deteriorate optical characteristics, resulting in poor visibility of LCD element 10 disposed on the back surface of the touch panel.

SUMMARY OF THE INVENTION

The present invention addresses the problems above. It is therefore the object of the present invention to provide a touch panel with good visibility capable of protecting a polarizing plate from distortion and deterioration, The touch panel of the present invention has a light-transmissive upper substrate with an upper conductive layer disposed on the bottom surface, a light-transmissive lower substrate with a lower conductive layer disposed on the top surface so as to face the upper conductive layer at predetermined spaced intervals, and a polarizing plate attached on the top surface of the upper substrate. The polarizing plate has a laminated structure in which a polarizing layer is sandwiched between an upper protective layer and a lower protective layer. The lower protective layer is a phase-difference layer with ¼ wavelength made of a cycloolefin-based polymer that is a material having high heat resistance up to approx. 160° C.

Employing such a high-heat-resistant material for the phase-difference layer protects the polarizing plate from distortion and deterioration, increasing visibility and decreasing parts count and accordingly the production cost of a touch panel.

That is, the present invention offers a cost-reduced touch panel with good visibility.

DETAILED DESCRIPTION OF THE INVENTION

Hereinafter will be described the structure of an exemplary embodiment of the present invention with reference to FIGS. 1 through 3. For easy understanding of the structure, each figure shows dimensions enlarged in the thickness direction. Through the figures, like parts have similar reference marks and the description thereof will be omitted. Additionally, as for the structure similar to that described in Background Art, similar reference marks are utilized and detailed description thereof will be omitted.

Exemplary Embodiment

Figure 1:
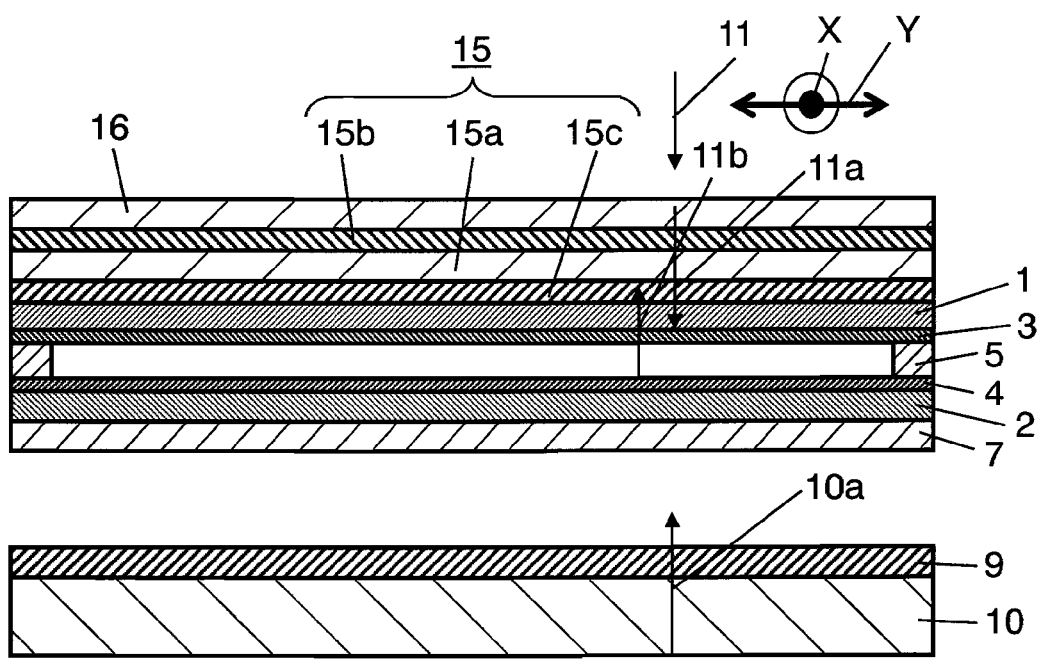
FIG. 1 is a sectional view of a touch panel of an exemplary embodiment of the present invention.

FIG. 1 is a sectional view of a touch panel of an exemplary embodiment of the present invention. The touch panel of FIG. 1 has light-transmissive upper substrate 1, light-transmissive lower substrate 2 and polarizing plate 15. Upper substrate 1 is formed into a film made of polyethersulfone, polycarbonate or the like. Lower substrate 2 is made of glass, acrylic resin, polycarbonate or the like. Upper conductive layer 3 is formed on the bottom surface of upper substrate 1 and lower conductive layer 4 is formed on the top surface of lower substrate 2 by sputtering, both of which are light-transmissive layers made of indium-tin oxide, tin oxide or the like.

A plurality of dot spacers (not shown), which are made of insulating resin, such as epoxy and silicone, are formed at predetermined spaced intervals on the top surface of lower conductive layer 4. A pair of upper electrodes (not shown) made of silver, carbon, or the like is formed at both ends of upper conductive layer 3. A pair of lower electrodes (not shown) is formed at the both ends of lower conductive layer 4 in an arrangement perpendicular to the upper electrodes.

Frame-like spacer 5 is made of epoxy, polyester, or the like. The outer peripheries of upper substrate 1 and lower substrate 2 are bonded by an acrylic or rubber bonding-layer (not shown) that is coat-formed on either one of the top and bottom surfaces of spacer 5. Spacer 5 allows upper conductive layer 3 and lower conductive layer 4 to face at predetermined spaced intervals.

Polarizing plate 15 has a laminated structure attached on the top surface of upper substrate 1. To be specific, polarizing layer 15a, upper protective layer 15b and lower protective layer 15c constitute polarizing plate 15 in a manner that polarizing layer 15a is sandwiched between protective layers 15b and 15c. Polarizing layer 16a is made of polyvinyl alcohol with iodine or dye oriented. Each of protective layers 15b and 15c, which is a flexible phase-difference plate with ¼ wavelength, is an oriented film having birefringence made of a norbornene-polymerized cycloolefin-based polymer.

Lower phase-difference plate 7 is bonded with adhesive (not shown) to the bottom surface of lower substrate 2. Hard-coating layer 16, which is made of light-transmissive material, such as acrylic, is formed on the top surface of polarizing plate 15. The touch panel is thus completed.

Lower phase-difference plate 7, which serves as a flexible phase-difference plate with ¼ wavelength, is an oriented film having birefringence made of a polycarbonate or cycloolefin-based polymer.

The top surface of polarizing plate 15 is covered with hard-coating layer 16. The relatively hard structure of hard-coating layer 16 protects polarizing plate 15 from damage in manufacturing, storage, transportation, or depressing operations.

Such structured touch panel is disposed on LCD element 10 through polarizing plate 9 and mounted on an electronic device. Each pair of upper electrodes and lower electrodes is connected to the electronic circuit (not shown) of the electronic device.

To select a desired function, a user presses the top surface of hard-coating layer 16 with a finger or stylus, while viewing the displays shown by LCD element 10 on the back surface of the touch panel. The application of the depressing force depresses down a position of polarizing plate 15 and upper substrate 1, allowing a position of upper conductive layer 3 corresponding to the depressed position to make contact with lower conductive layer 4. Through the connection of the conductive layers, voltage is applied to the upper electrodes and the lower electrodes from the electric circuits. The electronic circuit detects the depressed position from voltage ratio between the electrodes. The electronic device thus recognizes the user's selection and switches to the desired function.

In the operation above, extraneous light 11 such as sunlight and lamplight comes from above and passes through polarizing plate 15. Here, suppose that polarizing layer 15a of plate 15 absorbs Y-directional light wave perpendicular to X-direction light wave. In this case, extraneous light 11 changes to X-directional linearly polarized light 11a and enters into lower protective layer 15c from polarizing layer 15a. This light, as a result of passing through lower protective layer 15c with ¼ wavelength, changes from linearly polarized light to circularly polarized light and reflects upward (as reflected light 11b) at lower conductive layer 4.

When reentering lower protective layer 15c, reflected light 11b undergoes another ¼ polarization, so that reflected light 11b goes into polarizing layer 15a as a Y-directional linearly polarized light with a phase-shift of ½ wavelength. Polarizing layer 15a allows only X-directional light wave to pass through. Reflected light 11b, which is a Y-directional light wave, is blocked by polarizing layer 15a. Extraneous light 11 entered the touch panel from above reflects upward (as reflected light 11b) at lower conductive layer 4, however, reflected light 11b is blocked by polarizing layer 15a and does not exit from hard-coating layer 16 that serves as an operation surface of the touch panel. The structure offers a reflection-free good visibility of LCD element 10 on the back surface of the touch panel.

Meanwhile, polarizing plate 9 is disposed on LCD element 10 on the back surface of the panel. Suppose that polarizing plate 9 absorbs X-directional light wave. In this case, Y-directional linearly polarized light of lamplight 10a of LCD element 10 passes through lower phase-difference plate 7 with ¼ wavelength first, and then lower protective layer 15c with the same wavelength. After passing through the two layers above, lamplight 10a changes to X-directional linearly polarized light with a phase-shift of ½ wavelength and enters into polarizing layer 15a. After passing through polarizing layer 15a, lamplight 10 exits from the top surface of hard-coating layer 16. The structure offers a reflection-free good visibility of LCD element 10 on the back surface of the touch panel.

Additionally, upper protective layer 15b with ¼ wavelength is disposed on the top surface of polarizing layer 15a, which provides lamplight 10a from polarizing layer 15a with another ¼ polarization. Therefore, the linearly polarized light with a phase-shift of ½ wavelength exits from the touch panel. Consequently, a user wearing polarized sunglasses for X-directional linear polarization, for example, can easily recognize displays of LCD element 10 on the back surface of the panel.

Upper protective layer 15b and lower protective layer 15c, which are disposed on the top and the bottom of polarizing layer 15a, respectively, are phase-difference layers with ¼ wavelength made of a cycloolefin-based polymer that is a material having high heat resistance up to approx. 160° C. Compared to polycarbonate, the norbornene-polymerized cycloolefin-based polymer has higher heat resistance and lower moisture absorbency.

The high heat resistance of the material protects polarizing plate 15 from warpage and distortion, even if used under high temperatures, for example, in full sunlight, at the same time, the low moisture absorbency of the material protects polarizing plate 15 from deterioration of polarizing characteristics. That is, employing the aforementioned material offers good visibility of LCD element 10 on the back surface of the panel.

Forming lower protective layer 15c as a phase-difference layer with ¼ wavelength integrated with polarizing plate 15 eliminates the need for disposing another phase-difference plate between upper substrate 1 and polarizing plate 15. This contributes to reduced parts count and accordingly a cost-reduced touch panel.

Figure 2:
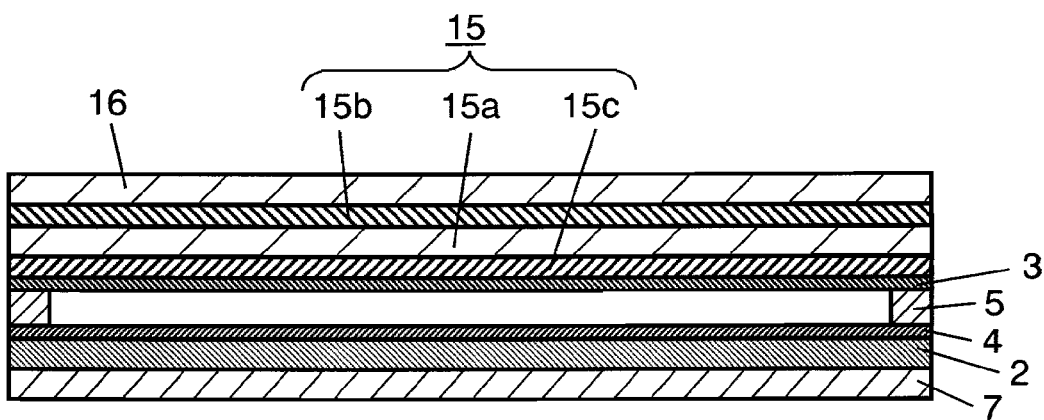
FIG. 2 is a sectional view of another structure of a touch panel of the exemplary embodiment.

FIG. 2 is a sectional view of another structure of a touch panel of the exemplary embodiment of the present invention. According to the touch panel in FIG. 2, upper conductive layer 3 is disposed directly under lower protective layer 15c of polarizing plate 15. Employing the structure above eliminates upper substrate 1, further reducing parts count. In the structure, lower protective layer 15c is formed as a phase-difference layer with ¼ wavelength made of a cycloolefin-based polymer.

Upper conductive layer 3 and lower conductive layer 4, which are made of indium-tin oxide, tin oxide or the like, are formed into a film or sheet. The film or sheet is generally formed by sputtering in an atmosphere with temperatures in the range of 130° C. to 150° C. The aforementioned cycloolefin-based polymer constituting upper protective layer 15b and lower protective layer 15c, since having high-heat resistance up to approx. 160° C., can bear high temperature, allowing upper conductive layer 3 to be formed with ease.

Figure 3:
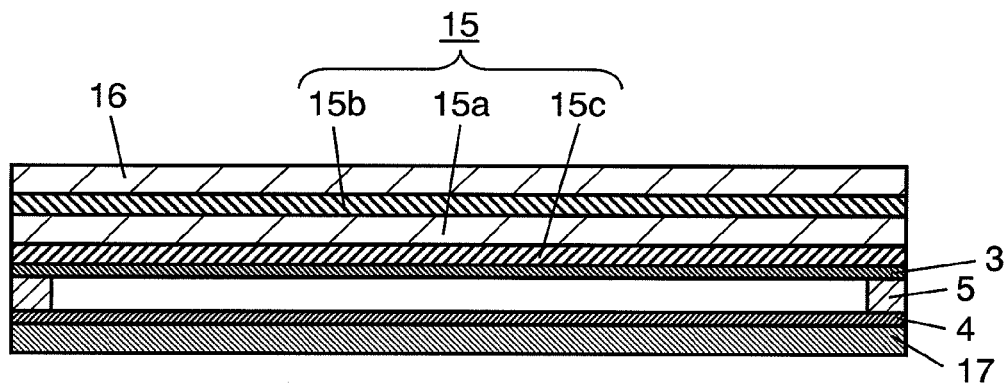
FIG. 3 is a sectional view of still another structure of a touch panel of the exemplary embodiment.
Figure 4:
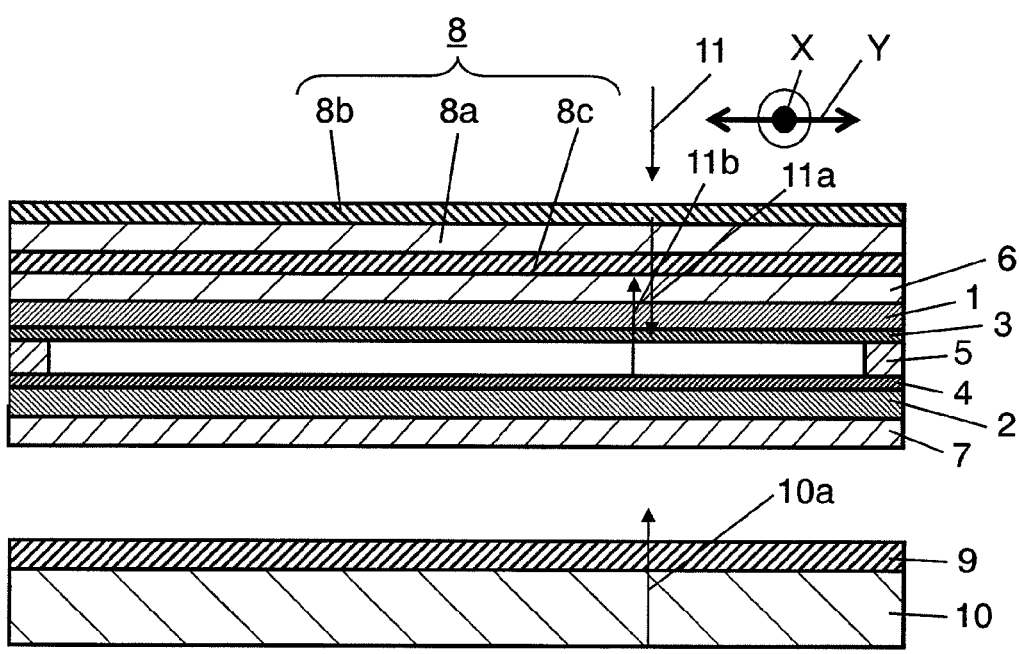
FIG. 4 is a sectional view of a conventional touch panel.

FIG. 3 is a sectional view of still another structure of a touch panel of the exemplary embodiment of the present invention. According to the touch panel in FIG. 3, like protective layers 15b and 15c, lower substrate 17 is a phase-difference plate with ¼ wavelength made of a cycloolefin-based polymer. Employing the structure above eliminates lower phase-difference plate 7, further reducing parts count. At the same time, the structure offers good visibility of LCD element 10 on the back surface of the panel.

According to the embodiment, as described above, lower protective layer 15c of polarizing plate 15 attached on the top surface of upper substrate 1 is a phase-difference layer with ¼ wavelength made of a cycloolefin-based polymer. The structure protects polarizing plate 15 from distortion and deterioration, offering good visibility. At the same time, the structure decreases parts count and accordingly the production cost of the touch panel.

The touch panel of the present invention is effective in enhancing visibility and decreasing the production cost. It is useful in providing an operation panel for various electronic devices.

The invention claimed is:

1. A touch panel comprising:
a light-transmissive upper substrate;
an upper conductive layer disposed on a bottom surface of the light-transmissive upper substrate;
a light-transmissive lower substrate;
a lower conductive layer disposed on a top surface of the light-transmissive lower substrate so as to face the upper conductive layer at predetermined spaced intervals; and
a polarizing plate attached on a top surface of the upper substrate, the polarizing plate being a laminated structure including
(i) a polarizing layer,
(ii) an upper protective layer, and
(iii) a lower protective layer,
wherein the polarizing layer is sandwiched between the upper protective layer and the lower protective layer,
wherein the lower protective layer directly contacts a lower surface of the polarizing layer, and
wherein the lower protective layer is a phase-difference layer with ¼ wavelength made of a cycloolefin-based polymer.

2. The touch panel of claim 1, wherein the lower substrate is a phase-difference plate with ¼ wavelength made of a cycloolefin-based polymer.

3. The touch panel of claim 1, wherein the lower protective layer directly contacts the lower surface of the polarizing layer over a substantial entirety of the lower surface of the polarizing layer.

4. The touch panel of claim 1, wherein the lower protective layer directly contacts the lower surface of the polarizing layer over an entirety of the lower surface of the polarizing layer.

5. The touch panel of claim 1, wherein the lower protective layer directly contacts the lower surface of the polarizing layer over an entirety of the lower surface of the polarizing layer, and
wherein a lower surface of the phase difference layer contacts an upper surface of the upper substrate, such that the lower protective layer constitutes a bottom layer of the polarizing plate.

6. The touch panel of claim 1, wherein the polarizing plate is a single and completed structure.

7. The touch panel of claim 1, wherein the polarizing plate consists of the polarizing layer, the upper protective layer, and the lower protective layer.

8. The touch panel of claim 1, wherein the polarizing plate consists essentially of the polarizing layer, the upper protective layer, and the lower protective layer.

9. The touch panel of claim 1, wherein the upper conductive layer is depressible to contact the lower conductive layer such that an electric circuit can detect a depressed position on the touch panel from a voltage ratio.

10. A touch panel comprising:
a polarizing plate including
(i) a polarizing layer,
(ii) an upper protective layer disposed on a top of the polarizing layer,
(iii) a lower protective layer disposed on a bottom of the polarizing layer, the lower protective layer constituting a bottom layer of the polarizing plate;
an upper conductive layer disposed on a bottom surface of the lower protective layer;
a light-transmissive lower substrate;
a lower conductive layer disposed on a top surface of the light-transmissive lower substrate so as to face the upper conductive layer at predetermined spaced intervals,
wherein the lower protective layer is a phase-difference layer with ¼ wavelength made of a cycloolefin-based polymer.

11. The touch panel of claim 10, wherein the lower substrate is a phase-difference plate with ¼ wavelength made of a cycloolefin-based polymer.

12. The touch panel of claim 10, wherein the lower protective layer directly contacts a lower surface of the polarizing layer over a substantial entirety of the lower surface of the polarizing layer.

13. The touch panel of claim 10, wherein the lower protective layer directly contacts a lower surface of the polarizing layer over an entirety of the lower surface of the polarizing layer.

14. The touch panel of claim 10, wherein the lower protective layer directly contacts a lower surface of the polarizing layer over an entirety of the lower surface of the polarizing layer, and
wherein a lower surface of the phase difference layer contacts an upper surface of the upper substrate, such that the lower protective layer constitutes a bottom layer of the polarizing plate.

15. The touch panel of claim 10, wherein the polarizing plate is a single and completed structure.

16. The touch panel of claim 10, wherein the polarizing plate consists of the polarizing layer, the upper protective layer, and the lower protective layer.

17. The touch panel of claim 10, wherein the polarizing plate consists essentially of the polarizing layer, the upper protective layer, and the lower protective layer.

18. The touch panel of claim 10, wherein the upper conductive layer is depressible to contact the lower conductive layer such that an electric circuit can detect a depressed position on the touch panel from a voltage ratio.

* * * * *